June 22, 1954 — F. D. KNOBLOCK — 2,681,824
GLARE SHIELD STRUCTURE FOR AUTOMOTIVE VEHICLES
Filed Aug. 8, 1951 — 2 Sheets-Sheet 1

INVENTOR.
Frederick D. Knoblock
BY
Barnes, Kisselle, Laughlin & Raisch
ATTORNEYS.

June 22, 1954  F. D. KNOBLOCK  2,681,824
GLARE SHIELD STRUCTURE FOR AUTOMOTIVE VEHICLES
Filed Aug. 8, 1951  2 Sheets-Sheet 2
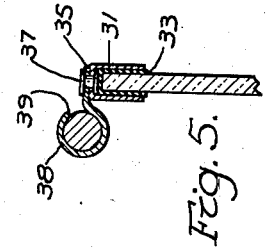
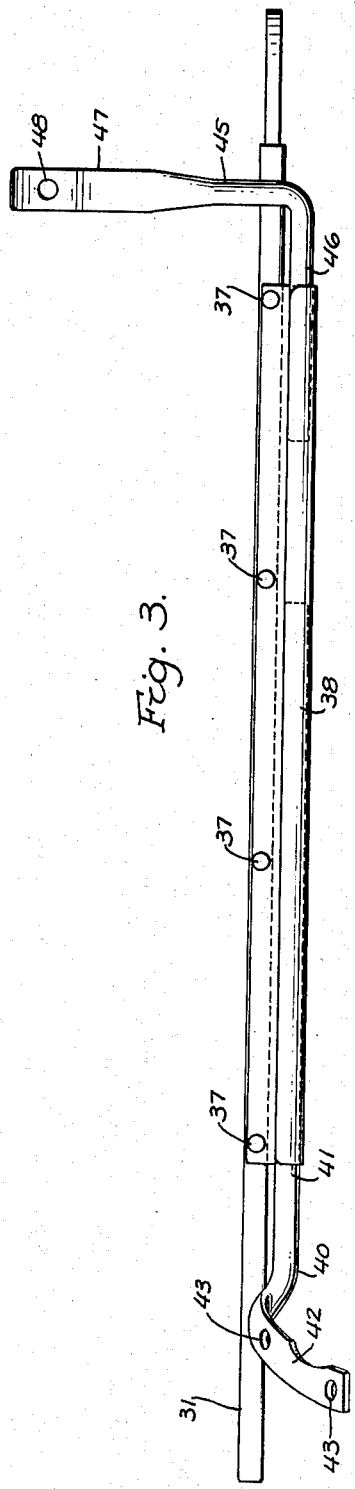
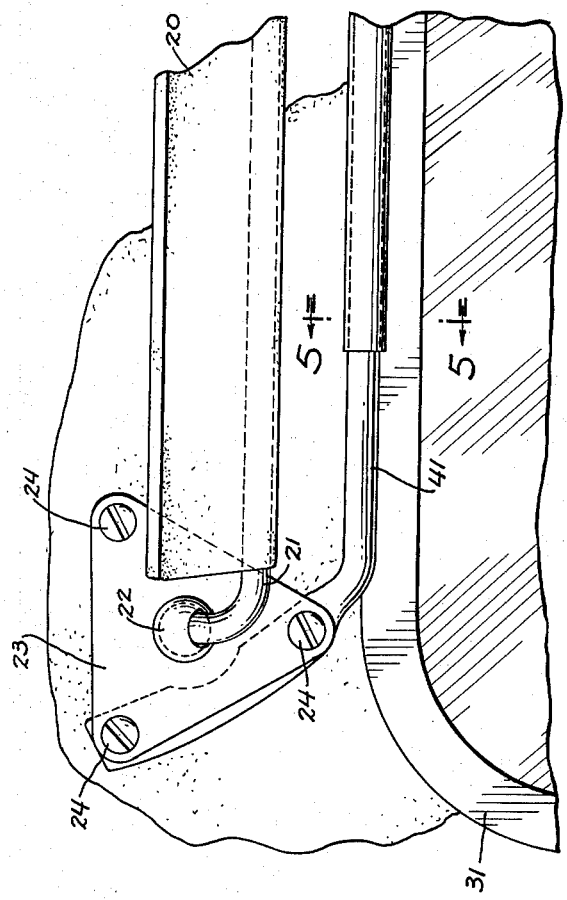
INVENTOR.
Frederick D. Knoblock
BY
ATTORNEYS.

Patented June 22, 1954

2,681,824

UNITED STATES PATENT OFFICE 2,681,824

GLARE SHIELD STRUCTURE FOR AUTOMOTIVE VEHICLES

Frederick D. Knoblock, Bloomfield Hills, Mich., assignor to Hildegarde T. Knoblock, Bloomfield Hills, Mich.

Application August 8, 1951, Serial No. 240,925

2 Claims. (Cl. 296—97)

This invention relates to a glare shield construction for automotive vehicles.

The principal object of the invention is to provide an improved glare shield construction which embodies a panel of light filtering material and which is so devised that it may be easily and conveniently mounted in an automotive vehicle, employing some of the existing structure in an automotive vehicle, and so that the glare shield, while shiftable into and out of operating position, offers little or no interference with the inside sun visor conventionally used in automotive vehicles, in the sense that the visor may be shifted to any of its operative or inoperative positions notwithstanding the presence of the glare shield. Usually an automotive vehicle, and especially passenger cars, are equipped with an opaque inside sun visor mounted adjacent and above the windshield and which, as is well known, may be shifted to various positions to block out light rays. The glare shield of the present invention embodies a transparent or translucent panel for filtering light rays and thus may be positioned directly in the line of sight to protect the eyes of the driver or other occupant or occupants.

In accordance with the present invention the glare shield embodies a light filtering panel and mounting means associated therewith, so arranged and constructed that one element of the mounting means may be secured in position by the means of support for the sun visor. Other mounting means are arranged and constructed so that it may be secured in position on and by structural elements existing in automotive vehicles. The arrangement is such that one mounting construction may be employed with a large number of automotive vehicles of different manufacture with the result that the structure of the glare shield may be pretty well standardized thus lowering manufacturing costs to the benefit of all concerned including a correspondingly low price to the public. The glare shield of the present invention is pivotally mounted and, because it may be made of safety glass, it may be relatively heavy. The invention provides a pivotal mounting such as to resist turning incident to torque caused by gravity and thus the glare shield may be held in a position extending in a horizontal direction from the pivot.

The invention will be better understood by a consideration of the following detailed description and by reference to the accompanying drawings, wherein is shown a glare shield constructed in accordance with the invention.

Fig. 3 is a plan view of the glare shield structure.

Fig. 4 is an enlarged detailed view illustrating the mounting of the glare shield at one end.

Fig. 5 is a sectional view taken substantially on line 5—5 of Fig. 4 showing the pivotal mounting.

Figure 1:
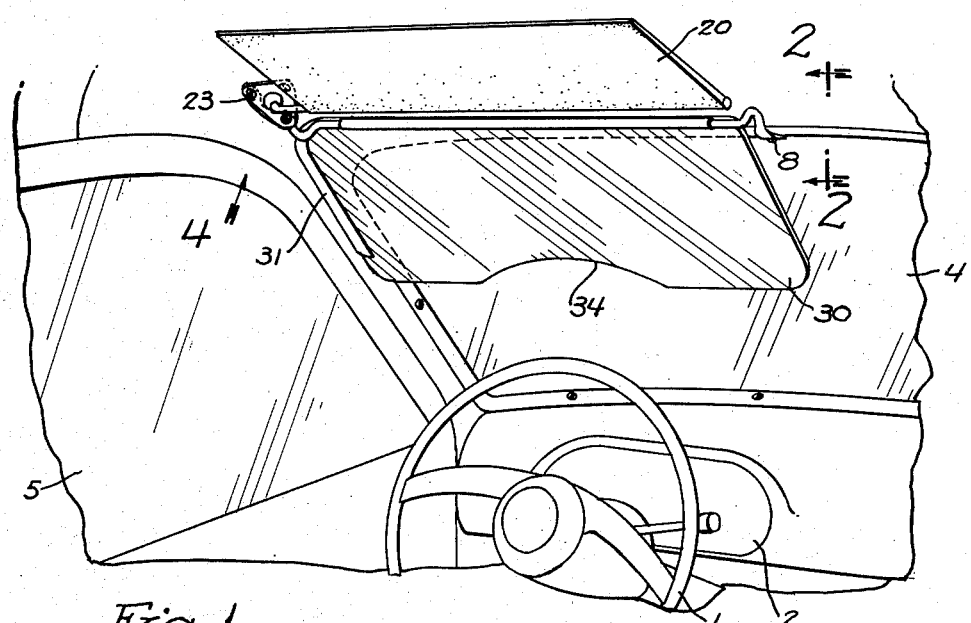
Fig. 1 is a general view of the interior of an automotive vehicle illustrating certain vehicle parts, the sun visor and the glare shield.

The structure shown in Fig. 1 is exemplary of the interior of an automotive vehicle on the driver's side, and the vehicle has a steering wheel 1, instrument panel 2, windshield 4, and a door with a window 5. The structure of the automobile is further illustrated in Fig. 2 wherein the upper edge of the windshield is shown suitably mounted in a channel formation, there being an interior molding strip 7. The molding strip is held in place by a plurality of screws 8. Above the molding strip is what may be called a header board 9 which is usually covered by interior trim usually in the form of a fabric 10. The exterior top portion of the car is illustrated at 12 and the header board may be supported by a structural element 13 having a portion 14 which underlies the molding 7. This structure is shown as merely being exemplary of body construction.

The conventional opaque sun visor is shown as being in the form of a panel 20 pivotally mounted upon and sometimes slidably mounted upon a supporting rod 21. The end of this rod is fashioned as shown in Fig. 4, and is pivotally mounted as at 22 in a bracket or plate 23. This bracket or plate is shown as being mounted in a position near the top of the windshield or above the same and near one edge thereof as by means of three screws 24. The plate 23 is merely representative of different plates or brackets employed and is not intended to indicate the precise shape. As a matter of fact, different manufacturers have different shapes of brackets but it has been found that the spacing of the screws 24, at least in a large number of makes of automotive vehicles, is substantially the same.

The glare shield comprises a transparent or translucent panel 30, the upper edge of which and one side edge of which is preferably mounted in a partial frame or channel 31 (Fig. 5), as by means of material or tape 33. The lower edge of the panel may be shaped as at 34 (Fig. 1) to provide clearance relative to the steering wheel or to follow the contour of the molding at the lower edge of the windshield.

The bearing structure preferably resides in an element or elements of sheet metal form which, as shown in Fig. 5, has a flat portion 35 secured to the channel 31. This flat portion may conveniently be disposed against the bight portion of the channel and may be secured thereto by rivets 37. The material extends laterally from the channel and is shaped substantially into circular form in cross section to provide a bearing portion 38. The edge of the bearing forming member may terminate, as at 39, so that the bearing structure is partially open. The bearing structure 38 may extend for the major length of the frame and panel, as shown in Figs. 1 and 3.

A support or mounting member is shown as being in the form of a rod 40 having a major hinge pin portion 41 received in the bearing 38. The bearing 38 is expanded somewhat when the pintle portion is placed therein so as to frictionally grip the pintle portion. The portion 41 constitutes a pintle and may extend for the major part of the length of the bearing portion 38, as shown in Fig. 3. The exposed end of this support or mounting member is of flattened form and the end may be integral with the portion 41. This end portion, as shown at 42, is formed to extend laterally from and at a suitable angle relative to the pintle portion 41 and provided with apertures 43.

To mount the glare shield, it is only necessary to remove two of the screws 24, as shown in Fig. 5, place the bracket portion 42 under the plate 23 and then replace the screws 24. Since the spacing of the screws and their general location is the same in many makes and models of automotive vehicles, but one form of support member is required for such automotive vehicles. The angularity of the bracket portion 42 relative to the pintle portion 41 is such that the pintle portion 41 extends laterally of the windshield and generally parallel to the pivoted edge of the visor.

Inasmuch as the glare shield may be relatively heavy, if made of safety glass, a stabilizing element 45 is preferably employed. This element has a rod or pintle portion 46 arranged to be disposed within the bearing 38 and it has a laterally extending attaching portion 47 provided with an aperture 48. This attaching portion, which is relatively flat, is generally formed so as to lie against the exposed face of the molding strip 7. To make the attachment, it is but necessary to remove one screw 9 which normally holds the molding strip 7, locate the attachment portion 47 and then re-insert the screw. The holding screw thus employed may vary in position with different vehicles, but to accommodate this, the portion 46 may be axially adjusted in the bearing 38. In the event, and as shown herein, that the panel or its frame projects laterally beyond the location of the securing element 45, the laterally extending arm thereof may be provided with a bent or bowed portion 51 to accommodate the frame or panel in its swinging movements as indicated in Fig. 2.

If it be found that the structure shown does not fit all vehicles, then it is only necessary to have one or more differently designed mounting devices, while the frame and its bearing portion may be the same for all vehicles. The material of which the panel may be formed may vary, as desired. It may be of laminated safety glass having colored glass or glass which is equipped with a polarizing film, or colored interlayer plastic; it may be of a colored plastic or light polarizing plastic; the coloring may be varied or graduated. All these are considered herein as light filtering material.

When the glare shield is mounted, it may appear substantially as illustrated in the drawings, with the axis of the panel positioned in close proximity to and somewhat below the axis of the visor. Thus the visor may be placed in inoperative position wherein it lies generally along and generally parallel to the inside trim 10, as shown in Figs. 1 and 2, and the glare shield may be pivoted upwardly or downwardly or positioned in an intermediate location as desired. In Fig. 1 the glare shield is shown positioned downwardly and adjacent the windshield. This is shown in full lines in Fig. 2. The dotted line position of Fig. 2 substantially shows the position the glare shield may be in when it is not in use, but, of course, the glare shield may be adjusted to any position intermediate the two positions shown. It is rather obvious how the visor may be manipulated without interference. Considering, for example, Fig. 1, the visor may be lowered on its pivot or it may be swung to the side on its mounting 22 to protect the occupant from the rays of the sun which may come in from the side. With the visor positioned at the side, the glare shield may be raised and lowered as desired. If one desires to so do, the visor may be disposed in an inoperative position along the side of the vehicle above the glass 5 of the door.

Figure 2:
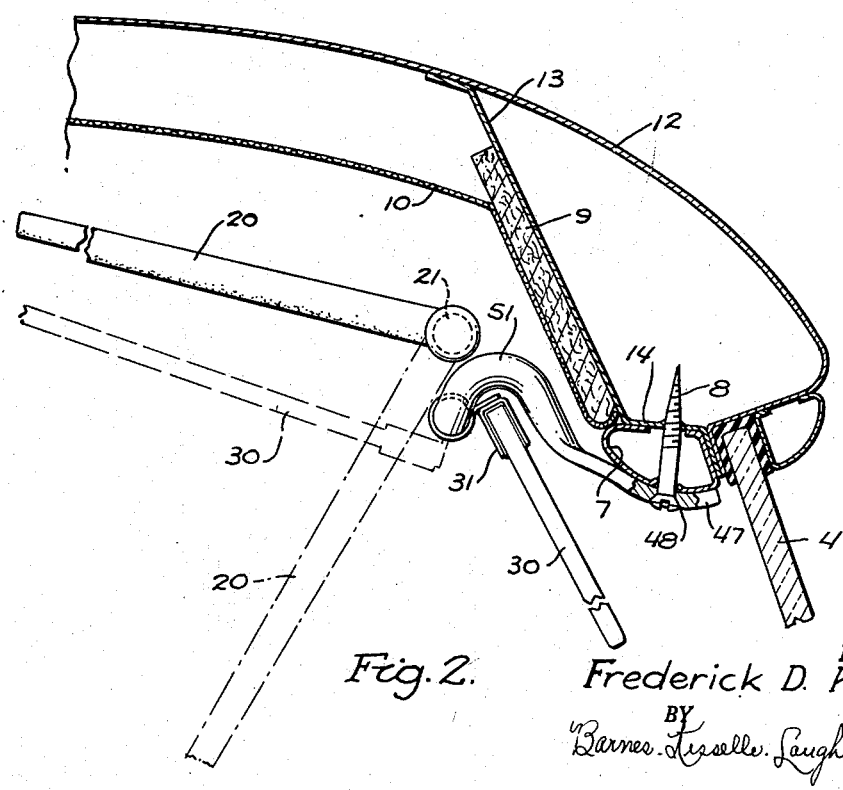
Fig. 2 is an enlarged view partly in cross section taken substantially on line 2—2 of Fig. 1.

The hinge construction thus provided is admirably adapted to hold the glare shield in the dotted line position shown in Fig. 2, or in any other laterally disposed position, where the gravity load of the panel places a torque on the mounting tending to swing the panel counterclockwise if Fig. 2 is viewed. Such movement of the panel tends to wrap the bearing 38 upon and contract the same upon the pintle portion 41. This also applies to the pintle portion 46. Accordingly, the panel will remain in such position even though it is subjected to the jolts and jarring incident to movement of the vehicle. As a result, it may require more effort to swing the panel say, from its dotted line position shown in Fig. 2, to its full line position, than it does to swing the panel in the reverse direction. When the panel is swung from its full line position, in Fig. 2, toward the dotted line position, which is clockwise as Figs. 2 and 5 are viewed, the tendency is to open or unwrap the bearing 38 and thus the bearing does not tend to grip the pintle or pintles so tightly.

I claim:

1. A glare shield for the interior of the body of an automotive vehicle having a windshield, a visor, a supporting plate for the visor secured to a portion of the body adjacent the windshield by a plurality of spaced securing devices which pass through the supporting member and into the body, and an interior molding strip along the upper edge of the windshield held in place by securing devices extending therethrough, comprising, a panel of light filtering material, a bearing member secured to the panel and disposed so that the axis thereof extends along one edge of the panel, a rod shaped mounting member having a pintle portion disposed within the bearing member so that the panel may be pivotally shifted about the same, said mounting member having an integral flattened end portion extending in an angled direction from the axis of the pintle portion, said flattened end portion being adapted to be disposed under said plate and having one or more openings therein for the passage therethrough of at least one of said securing devices, the angle between said flattened end portion and said pintle portion being such that the axis of the pintle portion is substantially parallel to the axis of the visor when the flattened portion is secured in position by said securing devices, another rod shaped mounting member having a pintle portion slidably and adjustably disposed within the bearing member and projecting from the opposite end thereof and having an integral laterally extending flattened part shaped to engage against the said interior molding strip and having an aperture therein for the passage therethrough of one of the securing devices for said molding strip.

2. A glare shield structure for the purpose of being mounted in an automotive vehicle which has a body with a windshield and a molding therefor held by screws and a visor adjustably mounted adjacent the windshield and wherein the mounting means includes a plate member secured by a plurality of screws to and against an interior surface of the body adjacent the upper part of the windshield, and for use as an accessory in conjunction with the visor comprising, a panel of light filtering material, bearing means extending along one edge of the panel, a pintle member in the form of a rod having a portion positioned in the bearing means and a portion extending from one end of the bearing means, said extending portion having an integral part fashioned to extend angularly of the pintle portion and the end of said integral part being flattened and adapted to be placed under the plate member, said flattened portion having apertures therein positioned to receive some of the screws of the plate member, another pintle in the form of a rod positioned in the bearing means and having a portion extending from the opposite end of the bearing means, said extending portion having an integral end part fashioned to extend laterally from the pintle portion and said end part being flat and shaped to fit against the said windshield molding, and having an aperture therein for receiving a holding screw for the said molding, the bearing means being rockable on the pintle portions and the pintle members being axially adjustable relative to each other in the bearing means for alignment of the said apertures in the two flat end portions for the receiving of the holding screws of the plate member and molding, the angle between the axis of the first mentioned pintle portion and the flattened end thereof being such that the axis of the pintle portion is substantially parallel to the axis of the visor when the flattened portion is secured in position by said screws of the plate member.

References Cited in the file of this patent

UNITED STATES PATENTS

| Number | Name | Date |
| --- | --- | --- |
| 1,599,183 | Phillips | Sept. 7, 1926 |
| 1,862,432 | Rose | June 7, 1932 |
| 1,989,929 | Jacobs | Feb. 5, 1935 |
| 2,237,700 | Goldman | Apr. 8, 1941 |
| 2,261,881 | Horstmann | Nov. 4, 1941 |